United States Patent [19]
Gagle et al.

[11] 3,902,914

[45] Sept. 2, 1975

[54] HYDROCARBONACEOUS-OIL SHALE COMPOSITION

[75] Inventors: Duane W. Gagle; Homer L. Draper, both of Bartlesville, Okla.

[73] Assignee: Phillips Petroleum Company, Bartlesville, Okla.

[22] Filed: Mar. 9, 1973

[21] Appl. No.: 339,536

[52] U.S. Cl. .................. 106/273; 106/281; 106/284
[51] Int. Cl. ..................... C08h 13/00; C09d 3/24
[58] Field of Search..................... 106/273, 281, 284

[56] References Cited
UNITED STATES PATENTS

| | | | |
|---|---|---|---|
| 1,643,520 | 9/1927 | Reeve | 106/284 |
| 1,649,545 | 11/1927 | Renou | 106/284 |
| 2,113,794 | 4/1938 | Léauté | 106/284 |
| 3,072,593 | 1/1963 | Marx et al. | 106/281 X |

*Primary Examiner*—Joseph L. Schofer
*Assistant Examiner*—Herbert J. Lilling

[57] ABSTRACT

The hydrocarbonaceous substance, e.g., a petroleum asphalt cement such as a residual, pitch, Trinidad asphalt, etc., is composited with an oil shale which has been ground to an average particle size of less than about 75 microns and then eminently admixed with the hydrocarbonaceous material at a temperature in the approximate range 250°–375°F.

9 Claims, No Drawings

HYDROCARBONACEOUS-OIL SHALE COMPOSITION

The invention herein described was made in the course of or under a contract or subcontract thereunder, (or grant) with the Department of the Air Force.

This invention relates to a hydrocarbonaceous composition. More particularly, it relates to a composition of a hydrocarbonaceous material and oil shale. Still more particularly, the invention relates to the compositing even without a solvent of a hydrocarbonaceous material e.g. a petroleum asphalt cement and the like with a finely divided or ground oil shale, the average particle size of which is measured in microns. the invention also relates to a method of compositing a hydrocarbonaceous material with a finely subdivided oil shale.

In one of its concepts, the invention provides an improved hydrocarbonaceous substance having better aging, plasticity, covering and adhesion properties than the original hydrocarbonaceous substance from which it is produced, the composition containing composited with the hydrocarbonaceous substance, a finely subdivided oil shale. In another of its concepts, the invention relates to a method for compositing a carbonaceous substance, as herein defined, with a finely subdivided oil shale, also as herein defined, to produce a composition having desirable aging, plasticity, covering and adhesion properties.

The compositions of the invention are particularly well suited for applications including among others, a pavement binder, roofing asphalts, tiles, mastics, etc.

U.S. Pat. No. 3,072,593 issued Jan. 8, 1963, describes and claims a process of making molded articles which consists essentially of intimately admixing oil shale, containing at least about 15 gallons of recoverable oil per ton of oil shale, and a solid polymer of a mono-1-olefin and subjecting said mixture to molding pressure at a molding temperature in the range of about 250° to about 400°F. Compositions and articles of manufacture are also claimed.

We have now discovered that oil shale, quite finely ground into particles which are substantially all of them less than 75 micron in size is a superior mineral filler product for asphalt, coal tar, petroleum resins, rubber or other binder of hydrocarbon or hydrocarbonaceous origin.

The oil shale is present in an amount in the approximate range from about 5 to about 75 weight percent based on the hydrocarbonaceous material. Amounts below the low end of this range are not now preferred because the advantages do not justify the labor expense involved. Amounts above the upper end of the range will yield per tanto the advantages herein discussed. However, in some cases, too much loading will deny to the composite sufficient of the properties of the binder. Thus, though within the broad scope of the invention amounts from about 0.5 to about 95 weight percent are possible, for some applications, presently preferred, in all applications, if costs are disregarded, is a range from about 10 to about 60 weight percent of the hydrocarbonaceous material.

In the manufacture of roofing shingles, the compounding of mastics, filling molded rubber products, producing paint pigments, mastic caulking and joint compound and the like, it has long been the practice to use fillers for example, diatomaceous earth, limestone dust, asbestos, silica, slate, flour, clay and even Portland cement. These fillers, upon comparison to the oil shale powder of the invention, have been found to be inferior. It is now believed that the inferiority can be attributed to the hydrophilic nature of these fillers. Thus, these fillers usually have a moisture interface, due to moisture adsorbed on the filler particles, when compounded with asphalt and this interface is thought to weaken the compounded structure, in many cases rendering it permeable to air and water. Thus, we have found that by use of oil shale powder, the major problem with fillers is overcome. Thus, oil shale is oleophilic and being so forms a tight bond with the hydrocarbonaceous cementing medium. Cut-back asphalt, for example, will form a continuous film on oil shale particles, i.e., it will oil-wet these particles completely, while other fillers, being more hydrophilic, will tend to bead or show observable contact angles under microscopic examination. The angle of wetting between asphalt and oil shale is appreciable larger than 90°, whereas with other fillers this is often an acute angle, i.e., less than about 90°.

Thus, we have found that durability of asphalt pavement can be greatly enhanced by the use of oil shale filler, as herein described, since complete coating of mineral fines can be obtained. This is rarely the case with othe commonly used fillers for example, limestone, slate, flour, silica, etc.

Although there have been here stated the reasons for which the compositions of the invention are thought to be unique in their makeup and properties, it is also possible that in the intense mixing procedure of the method of the invention whereby the carbonaceous substance e.g. the asphalt cement and oil shale powder are composited, there is a physical and/or chemical action or interaction peculiar to the choice of substances and their preparation prior to the compositing step.

Thus, it is known that the kerogen in the oil shale can be removed therefrom by retorting. It is contemplated that in the mixing step or possibly even in the grinding of the oil shale step, temperatures permitting the release of some of the kerogen in a form such that the compositing is made more tenacious occurs.

In any event, it does appear as a result of testing of properties that there is some action taking place between the oil shale powder and the binder material with which it is composited since the properties cannot be accounted for merely upon the basis of pure nonreacting physical admixture.

There is also to be considered the contact angles which result between the oil shale and binder material respecting the exclusion of water not only at the time of the intense or intimate admixture of the oil shale powder and the binder material but also thereafter.

It is an object of this invention to provide a hydrocarbonaceous substance-oil shale composition. It is another object of this invention to provide a method for compositing a hydrocarbonaceous substance or binder material having the nature of asphalt, pitch, and the like, with an oil shale. It is a further object of this invention to provide a composition suitable for use in pavement, roofing materials, asphalt tile, mastic, caulking, etc. It is a further object of this invention to improve the aging, plasticity, covering and adhesion properties of binder materials.

Other aspects, concepts, objects and the several advantages of the invention are apparent from a study of this disclosure and the appended claims.

According to the invention, there is provided a composite of a hydrocarbonaceous binder material as herein described and oil shale. Still according to the invention there is provided a method for compositing a binder material as herein described with an oil shale which comprises the steps of grinding the oil shale to an average particle size of less than about 75 microns and then intimately admixing the powder thus obtained with the binder material.

Generally, according to the now preferred forms of the invention, the hydrocarbonaceous binder materials which can be used and which can be improved thereby include bituminous cements such as those prepared from residuals, pitch, Trinidad asphalt, etc.

The following table, by way of example, gives the petroleum asphalt cements properties which are now preferred for such cements.

| Penetration Grades (ASTM D946) | Petroleum Asphalt Cements Ring & Ball Softening Temperature (ASTM D36) | Ductility 77°F. (ASTM D113) |
|---|---|---|
| 16–20 | 80–105°C. | Minimum 3 cm |
| 60–70 | 40–65°C. | Minimum 75 cm |
| 85–100 | 40–65°C. | Minimum 75 cm |
| 120–150 | 40–60°C. | Minimum 75 cm |
| 200–300 | 30–45°C. | Minimum 75 cm |

The selection of the asphaltic cement will depend on its application as is well known in the art. For example for road surfaces, the petroleum asphalt cement is a material having a penetration of from 75 to about 100 and a ring and ball softening temperature of from about 40 to 65°C.

Thus also for bituminous or asphalt roofing shingle production an air blown asphalt having a ring and ball softening point of about 93°C. and a penetration of about 16–20 is preferred.

The nature and amount of binder material and oil shale to be used will vary widely depending upon the ultimate properties sought to be obtained and can be determined by mere routine testing in the light of this disclosure.

The oil shale will contain usually from about 15 to about 40 gallons of oil per ton of shale, preferably from about 25 to about 35 gallons of oil per ton of shale.

In actual practice of the invention, the oil shale is ground to a proper mesh size, usually 200, in a suitable apparatus such as a ball mill.

In the following are given physical characteristics and particle size distribution for six mineral fines, including the oil shale used in this application.

Characterization of the Mineral Fillers Tested as Determined by Scanning Electron Microscope, Magnification 2000X at 45°

Oil Shale fines have dolomite and calcite crystals as the main mineral constituents. Kerogen, a bituminous material, is present but difficult to distinguish optically. The minor components are albite, a type of triclinic sodium feldspar, and illite. Illite particles are small thin flakes without a definite outline. The appearance is moderately angular with a lamellar positioning noted with some particles.

Regular Shale fines are characterized by the calcite and quartz crystals intermixed with a large number of muscovite mica crystals. The mica crystals are flat, thin and elastic. A minor constituent is kaolinite, a hydrous aluminum silicate clay.

Diatomaceous Earth fines consist of the silicon dioxide skeletal structures of diatoms. The silica is mainly amorphous opal. Some quartz particles are evident. The diatom structures are greatly varied in shape but relatively uniform in size. The fragments present an interesting assortment of rods, perforated plates, and other configurations. The particles obviously would defy close packing or orientation.

Rhyolite fines show the major components are potassium feldspar and quartz. There is a small amount of biotite mica. The particles are irregular and less blocky. There is more uniformity in the general appearance. Many ragged edges and nodules are apparent.

Slate fines consist of fine quartz crystals and muscovite mica as the major components. Minor constituents are chloride and calcite. The particles are angular for calcite and flat for mica. Shapes are irregular.

Portland Cement is entirely calcium silicates. The particles are angular with ragged, irregular shapes.

| Constituent Analysis Determined by Emission Spectrograph and X-ray Diffraction Equipment | | | | | | | |
|---|---|---|---|---|---|---|---|
| Chemical | | Oil Shale | Reg. Shale | Diatom. Earth Parts per million | Rhyolite | Slate | Portland Cement |
| Chromium | Cr | 300 | 270 | 37 | 40 | 60 | 200 |
| Vanadium | V | 37 | 140 | | | | |
| Nickel | Ni | 18 | 17 | | 18 | 18 | 18 |
| Barium | Ba | 69 | 690 | | 690 | | 690 |
| Boron | B | D | D | D | D | D | D |
| Phosphorus | P | | | 600 | | 600 | |
| Iron | Fe | $4 \times 10^4$ | $93 \times 10^3$ | $19 \times 10^3$ | $4 \times 10^4$ | $19 \times 10^3$ | $4 \times 10^4$ |
| Manganese | Mn | 310 | 310 | 3,000 | 310 | 300 | 300 |
| Magnesium | Mg | $21 \times 10^3$ | $46 \times 10^2$ | $5 \times 10^3$ | $5 \times 10^3$ | $5 \times 10^3$ | $5 \times 10^3$ |
| Lead | Pb | 34 | | | | | 60 |
| Molybdenum | Mo | | | | D | | D |
| Tin | Sn | | | | | | 15 |
| Calcium | Ca | $2 \times 10^4$ | $35 \times 10^3$ | $5 \times 10^2$ | $14 \times 10^3$ | $2 \times 10^4$ | $5 \times 10^4$ |
| Cadmium | Cd | | | D | | D | |
| Copper | Cu | 70 | 44 | 4,000 | 70 | 200 | 70 |
| Cobalt | Co | | | | | | D |
| Titanium | Ti | 19,000 | 19,000 | 2,700 | 19,000 | 2,700 | 19,000 |
| Zirconium | Zr | | 190 | | 190 | 600 | 690 |
| Sodium Monoxide | Na$_2$O | $4 \times 10^4$ | $2 \times 10^4$ | $2 \times 10^3$ | $4 \times 10^4$ | $4 \times 10^4$ | D |
| Aluminum Oxide | Al$_2$O$_3$ | $15 \times 10^4$ | $15 \times 10^4$ | $8 \times 10^3$ | $14 \times 10^4$ | $14 \times 10^4$ | $15 \times 10^4$ |

-continued

Constituent Analysis Determined by Emission Spectrograph and X-ray Diffraction Equipment

| Chemical | | Oil Shale | Reg. Shale | Diatom. Earth Parts per million | Rhyolite | Slate | Portland Cement |
|---|---|---|---|---|---|---|---|
| Silicon Oxide | SiO$_2$ | 80×10$^3$ | 54×10$^4$ | 8×10$^4$ | 54×10$^4$ | 8×10$^4$ | 8×10$^4$ |

D—Determined as present but not measured.

Percentage of Particles Smaller Than Indicated Size

| Size, Microns | Oil Shale | Reg. Shale | Diatom. Earth | Ryolite | Slate | Portland Cement |
|---|---|---|---|---|---|---|
| 0.7 | 0.30 | 1.79 | 1.20 | 0.26 | 2.18 | 0.29 |
| 1.0 | 0.98 | 5.64 | 3.88 | 1.04 | 6.24 | 0.98 |
| 2 | 4.18 | 15.37 | 12.95 | 4.11 | 19.53 | 3.44 |
| 4 | 10.95 | 30.39 | 29.95 | 9.95 | 38.47 | 5.65 |
| 7 | 18.08 | 47.40 | 48.15 | 16.06 | 54.60 | 8.20 |
| 10 | 22.75 | 56.67 | 56.96 | 20.04 | 61.54 | 10.93 |
| 20 | 40.33 | 77.08 | 96.35 | 37.29 | 75.69 | 23.71 |
| 40 | 70.37 | 94.05 | 99.96 | 73.19 | 91.64 | 63.55 |
| 70 | 95.89 | 99.52 | 100 | 98.56 | 99.41 | 96.27 |
| 75 | 100 | 100 | — | 100 | 100 | 100 |

The following tabulations give additional information with respect to compositions according to the invention. The tabulations are self-explanatory.

| TYPICAL PROPERTIES OF RAW SHALE | |
|---|---|
| Fischer Assay, Gal. oil per ton | 30 |
| Min. CO$_2$, wt.% | 17 |
| Ash, wt.% | 66 |
| Total carbon | 84 |
| Hydrogen, % | 11 |
| Nitrogen, % | 2 |
| PROPERTIES OF REFERENCE ASPHALT | |
| Penetration, 77°F., 100g. 5 sec. | 92 |
| Specific Gravity, 60/60 | 1.0084 |
| Softening Point, Ring & Ball, °F. | 113 |
| Ductility, 77°F., 5 cm/min. | 150+ |
| Cleveland Open Cup Flash, °F. | 670 |
| Viscosity, Centistokes, 275°F. | 340 |
| Thin Film Oven Test | |
| Loss, wt.% | .03 |
| Penetration, 77°F., 100 g, 5 sec. | 61 |
| Retained Penetration, percent | 64 |
| Ductility, 77°F., 5 cm/min. | 150+ |
| Viscosity, Centistokes, 275°F. | 444 |
| 325°F. | 136 |
| Solubility, CCl$_4$, percent | 99.95 |
| Spot Test, Std. Naphtha | Neg. |
| SURFACE AREA OF MINERAL FINES (PASSING 200 MESH SIEVE) | |
| Determined by nitrogen absorption | |
| Mineral | Surface Area Sq. M/Gram |
| Oil Shale | 2.3 |
| Regular Shale | 11.7 |
| Diatomaceous Earth | 29.3 |
| Rhyolite | 23.2 |
| Slate | 8.4 |
| Portland Cement | 1.7 |

Samples were prepared by stirring together in a 600 ml beaker 198 g of test fines with 252 g of the reference asphalt heated to 350°F. The ratio of fines to asphalt is 44:56 percent by weight. All samples were blended to this ratio except diatomaceous earth which was blended to a 22:78 fines to asphalt ratio. This was because the high surface area of the diatomaceous earth required more asphalt for testing. Unless otherwise indicated these compositions were used throughout the tests in this application.

The aging behavior and viscosity slope of a composited asphalt are properties from which the suitability of the asphalt can be determined normally. The following is given to permit property comparisons of the several indicated materials. The lower the slope value, the better the product properties, e.g a low slope means low tendency to lose plasticity and thus to become brittle or frangible.

AGING BEHAVIOR AND VISCOSITY SLOPE

The aging apparatus continuously measures the viscosity of a test specimen at a controlled temperature while exposing a changing film of asphalt (containing fines) to a simulated aging situation. In this test, the specimens were aged for 24 hours at 325°F. Viscosity is measured in centistokes = centipoises × density.

Slope is the rate of change in viscosity during aging over a set time period. It is calculated by dividing the numerical difference in initial viscosity and final viscosity after aging by the number of hours of aging, in this case by 24.

| Viscosity, Centistokes | Reference Asphalt | Reference Asphalt Compositions Containing: | | | | | |
|---|---|---|---|---|---|---|---|
| | | Oil Shale | Regular Shale | Diatomaceous Earth | Rhyolite | Slate | Portland Cement |
| Initial | 139 | 350 | 310 | 410 | 315 | 320 | 350 |
| After 12 Hr. | 158 | 370 | 365 | 455 | 400 | 360 | 435 |
| After 24 Hr. | 182 | 400 | 425 | 500 | 480 | 410 | 490 |
| Slope After 24 Hr. | 1.79 | 2.08 | 4.79 | 3.75 | 6.88 | 3.75 | 5.83 |

As shown above, the oil shale filled asphalt has the lowest slope value of the filled asphalts and is therfor least susceptable to become brittle upon aging.

WEATHEROMETER TEST

The tests were carried out in a weatherometer cabinet equipped with two carbon lamps to provide light and heat, and a rotating element containing the sample holders. The element rotates clockwise at the rate of one revolution per minute. Each sample holder rotates 60° counter-clockwise per one-half revolution of the element. During a two hour cycle, the samples are exposed to 102 minutes of light at 140°F. and 18 minutes of light and water spray at 80°–95°F.

Glass plates 3½ × 3½ inches were used to hold the film. A sample of asphalt blended with fines, in the ratios given previously, was placed on the glass plate to provide a film of about 3/32 inch average thickness. The samples were weighed before and after exposure at room temperature.

Samples were weathered for 300 hours which is equivalent to 1 year exposure.

From the weatherometer test results given below, it is evident that the oil shale filled asphalt had the lowest weight loss indicating good adhesion of the asphalt to the filler and good cohesion of the asphalt film so that the particles are not readily detached and removed under the test conditions.

| Sample | Weight Loss After 300 Hrs., Percent |
| --- | --- |
| Ref. Asphalt Only | 7.13 |
| Asphalt Containing: | |
| Oil Shale | 1.45 |
| Regular Shale | 2.18 |
| Diatomaceous Earth | 1.93 |
| Rhyolite | 2.05 |
| Slate | 1.66 |
| Portland Cement | 35.35* |

*Weight gain. This sample was heated in an oven for 24 hours at 140°F. but weight gain remained constant.

Plastic properties, i.e., plasticity of the reference asphalt, earlier described, composited with the indicated materials as before are given in the following table.

| | PLASTIC PROPERTIES: Test run in accordance with ASTM D-423 and D-424. | | |
| --- | --- | --- | --- |
| Asphalt With | Liquid Limit | Plastic Limit | Plasticity Index |
| Oil Shale | 35.5 | 31.1 | 4.4 |
| Regular Shale | 32.3 | 22.4 | 9.9 |
| Diatomaceous Earth | 108.0 | 103.2 | 4.8 |
| Rhyolite | 25.3 | 23.3 | 2.0 |
| Slate | 29.9 | 22.4 | 7.5 |
| Portland Cement | 18.6 | 18.0 | 0.6 |

The plasticity index is the numerical difference between the liquid limit and plastic limit as tested by the ASTM methods given above and a value of the index below about 10 is considered satisfactory for an acceptable plastic range without addition of a plasticizer. All of the materials tested are acceptable. The plastic index of the oil shale composition is comfortably within the accepted range.

ADHESION BEHAVIOR

One of the important and unique characteristics of the composition according to the invention is adhesion. The following adhesion tests were made with specimens prepared as described with results as tabulated.

Test specimens were prepared by use of a brass mold 3/8 inch I.D. × 1/2 inch high. Reference asphalt was blended 50/50 by weight with Stoddard solvent to produce the desired viscosity for handling at room temperature. The mineral fines in the same ratios as before were mixed with the test asphalt solution to produce a composite in which the particles were completely coated and the mixture of proper consistency for molding. The specimen was extruded from the mold into a dry porcelain dish without removing the solvent.

Distilled water at room temperature was added immediately to the dish containing the molded specimen until the specimen was completely immersed. Observations were made of the soaking reaction within 15 minutes and after soaking 24 hours; a rating system was utilized having the following values:

0 — Very Poor. Specimen disintegrated.

1 — Poor. Maintained form. Particles and asphalt separated substantially.

2 — Fair. Maintained form. Particles and asphalt showed some separation.

3 — Good. Slight discoloration but no visible separation.

4 — Excellent. Particles completely coated with asphalt and no discoloration or separation.

Under this system a specimen was considered a failure unless it rated 3 or 4 after soaking 24 hours.

| Reference Asphalt Plus | Oil Shale | Regular Shale | Diatomaceous Earth | Rhyolite | Slate | Portland Cement |
| --- | --- | --- | --- | --- | --- | --- |
| Without Additive | 4 | 3 | 3 | 0 | 3 | 0 |
| With 1% Anti-strip[1] | — | — | — | 4 | — | 2 |
| With 1% Hydrated Lime | — | — | — | 0 | — | 0 |
| Anti-strip & Hydrated Lime | — | — | — | 4 | — | 3 |

[1]The anti-strip additive was a fatty acid amine in a hydrocarbon vehicle, a brownish liquid, density 0.932, pour point 45°F. and a Saybolt Universal Second viscosity at 145°F. of 269. ("Pavebond", Carlisle Chemical Co.)

Oil Shale filler is shown to perform outstandingly compared to all other fillers tested, having a rating of excellent without additive treatment.

The blank spaces in the table (—) signify no additional benefit was found after the indicated treatment.

TENSILE AND SHEAR TESTS

Finally, the tensile and shear test strengths of specimens which were prepared further illustrate the properties obtainable with the compositing of the ingredients of the invention.

Specimens were prepared by blending fines with reference asphalt at the ratio of 44/56 weight percent except for diatomaceous earth which was blended 22/78 as set forth previously. A special jig was used to provide a film thickness of 75 microns between test plates of ¼ square inch area. Tests were conducted at 39.2°, 77°, and 110°F. for unaged and after aging 24 hours at 325°F. Specimens were pulled at a constant rate. Load to failure was measured in pounds with a proving ring connected to recording equipment. Shear test was made with same equipment except for a special sample holder used to permit positioning at a right angle to direction of pull.

| | LOAD IN POUNDS REQUIRED FOR FAILURE | | | | | |
|---|---|---|---|---|---|---|
| | 39.2°F. | | 77°F. | | 110°F. | |
| | NA | A | NA | A | NA | A |
| TENSILE | | | | | | |
| Reference Asphalt | 115 | 119 | 68.0 | 80.0 | 12.3 | 8.8 |
| Reference Asphalt Containing | | | | | | |
| Oil Shale[1] | 208 | 262 | 60.9 | 75.8 | 8.8 | 12.0 |
| Regular Shale | 249 | 259 | 47.8 | 67.9 | 9.0 | 14.2 |
| Diatomaceous Earth | 261 | 317 | 49.0 | 75.9 | 6.4 | 11.6 |
| Rhyolite | 260 | 212 | 32.2 | 62.2 | 9.1 | 12.9 |
| Slate | 287 | 333 | 61.8 | 81.8 | 7.7 | 15.2 |
| Portland Cement | 280 | 217 | 51.5 | 65.9 | 6.7 | 13.5 |
| Average of Filled Asphalt | 257.5 | 250 | 55.3 | 71.6 | 7.95 | 13.2 |
| SHEAR | | | | | | |
| Reference Asphalt | 117 | 132 | 16.8 | 29.7 | 0.95 | 2.8 |
| Reference Asphalt Containing | | | | | | |
| Oil Shale | 162 | 176 | 32.0 | 37.4 | 2.2 | 3.3 |
| Regular Shale | 172 | 182 | 27.3 | 32.5 | 3.1 | 4.7 |
| Diatomaceous Earth | 153 | 191 | 27.1 | 34.9 | 2.2 | 3.0 |
| Rhyolite | 155 | 170 | 25.5 | 31.0 | 2.6 | 3.2 |
| Slate | 152 | 170 | 24.3 | 37.7 | 3.0 | 3.2 |
| Portland Cement | 151 | 170 | 22.9 | 37.7 | 1.9 | 2.7 |
| Average of Filled Asphalt | 157.5 | 176 | 26.5 | 35.2 | 2.5 | 3.35 |

NA—Nonaged.
A—Aged 24 hours at 325°F.
[1]Filler to asphalt ratios are disclosed previously.

As shown by the test results, all the fillers tested show the expected reinforcing properties, especially in the shear tests. The oil shale filler performed well especially after aging and at the higher temperatures. Thus the advantages shown in the other tests have been achieved without affecting the other desirable properties of a filler.

The oil shale which has been described and any oil shale which is suitable for the practice of the invention is one which when comminuted will not become sticky to an extent such that comminution and/or compounding or compositing cannot be accomplished therewith. Thus, if the oil shale releases too much oil during the grinding or crushing to accomplish the desired particle size, it will, of course, not be preferred according to the best mode of operation of the invention. Further, if there is too little oil in the oil shale, it likely will have a lower binding power and therefore would not be suitable.

When a rubber, or similar material is used, incorporation of the powdered oil shale can be accomplished as in a rolling mixer or Banbury mixer. Or the powdered oil shale may be added to a solution of the rubber. After thorough mixing, the solvent is evaporated leaving a homogeneous blend of oil shale and rubber.

The fillers herein discussed are to be distinguished from aggregate such as crushed rock of fairly large size relative to the particle size of the subdivided shale.

In preparing a mixture of asphalt and oil shale filler according to the invention either before or after aggregate has been added the desired proportions are fed into, say, a pug mill in the absence of a solvent to obtain a free flowing composite which will have a temperature of the order of several hundred degrees of Fahrenheit usually about 250° to 375°F. On cooling, the mass will set to a plastic which on curing for, say, 12 to 48 hours will harden. Slurry or emulsion mixing can be used, if desired.

It will be noted that the viscosity slope given in the table herein is lower for the oil shale than for regular shale or the other materials of the table. Thus, the viscosity increase with accelerated aging, which causes brittleness in pavement or roofing, which is not desired, is much less with oil shale filled with asphalt than for any of the other listed materials. This is due to the characteristics inherent in the oil shale and in the composite of the invention as discussed elsewhere herein.

Any type of asphaltic material will benefit from the use of the invention when a filled asphalt cement is required. Although the ranges of 0.5 to 95 weight percent based on the asphalt, preferably 10–60 weight percent, which are approximate ranges, have been given it will be obvious to one skilled in the art working with his knowledge and the information of this disclosure that in any case he can by mere routine test determine other proportions with regard to specific binders and specific oil shales to obtain best results in such specific combinations. Thus, the actual amount required will depend on the end use, the properties desired and will be well within the skill of the practitioner and the standards known in the industry.

Thus, the broad range of 15 to 40 gallons of oil per ton of oil shale preferably 25 to 35 gallons of oil per ton of oil shale given herein are approximate ranges in which the best results of the invention can be obtained. One skilled in the art in possession of this disclosure will be in position to suitably and routinely test for the specific oil shale and binder and results or properties desired to determine the specific ingredients and amounts which he should use.

Finally, on the particle size of the oil shale it is a requirement of the invention that the average particle size be of the order as indicated. Certain considerations obtain: It is necessary to have a powder that is not so fine as to make mixing difficult. Further, the flow of the mixed materials and curing will, of course, depend upon the relative sizes of the ingredients being admixed. The energy requirements for admixing of the ingredients of the composition will differ to some extent depending upon particle size, condition of the ingredients, etc. as one skilled in the art in possession of this disclosure can readily appreciate.

Although the invention is now preferably executed without use of any solvent, it is within the scope of the invention during mixing of the ingredients to apply heating and/or cooling methods and even a minor quantity of a wetting agent or solvent although this is not now preferred in view of results obtained without such agents.

In summary, the data herein presented show:

The compositions with oil shale of this invention have superior viscosity slopes, aging characteristics and adhesion than conventionally used fillers. These advantages are gained without affecting the other properties such as tensile and shear strengths which vary only slightly from one filler to the other.

The advantages gained by the use of the compositions of this invention are improved durability of roads, roofs, etc., greater resistance to freeze-thaw cycles because of greater water repellency and improved long term viscosity stability, i.e., less likelihood of cracking or spalling. In addition, the strength of the asphaltic cement interfaces of film with the aggregate which is required for a pavement structure, will be benefited by the improved adhesion of the asphalt film to the filler particle because of greater wettability of the particle by the asphalt.

Reasonable variation and modification are possible within the scope of the foregoing disclosure and the appended claims to the invention the essence of which is that a finely subdivided oil shale or powder upon admixture with a binder as herein described and in manner and about as herein described has yielded compositions having superior properties also as described.

We claim:

1. A bituminous binder comprising an asphalt compounded with finely subdivided oil shale containing from about 15 to about 40 gallons of oil per ton and having a particle size of the order of less than about 75 microns at a temperature in the approximate range 250°–375°F and the oil shale being present in an amount in the approximate range 0.5–95 weight percent of the asphaltic material, said substance having better aging and adhesion properties than obtained when a conventional mineral filler is substituted for the particulate oil shale.

2. A composition according to claim 1 wherein the oil shale is present in an amount in the approximate range 5 – 75 weight percent based on the asphalt.

3. A composition according to claim 1 wherein the oil shale is present in an amount in the approximate range 10–60 weight percent based on the asphalt.

4. A composition according to claim 1 wherein the asphaltic material has the properties: Penetration (ASTM D 946) from about 16 to about 300; and Ring and Ball Softening Temperature (ASTM D 36) about 30° to about 105°C. and a Ductility at 77°F. (ASTM D 113) of a minimum about 3 centimeters.

5. A composition according to claim 1 wherein the asphaltic mat is a petroleum asphalt.

6. A composition according to claim 5 wherein the petroleum asphalt has a penetration, as herein defined, of about 75–100 and about 40°–65°C. Ring and Ball Softening Temperature.

7. A composition according to claim 5 wherein the petroleum asphalt has a penetration, as herein defined, of about 16–20, a Ring and Ball Softening Temperature of 80°–105°C. and a minimum ductility of about 3.

8. A composition of a petroleum asphalt having a penetration of about 16–300 (ASTM D 946), and Ring and Ball Softening Temperature of from about 30° to about 105°C.; and a Ductility at 77°F. (ASTM D 113) of at least about 3 centimeters in an admixture with about 0.5–95 weight percent based on the asphalt of a finely subdivided oil shale having a particle size of less than about 75 microns and containing about 15–40 gallons of recoverable oil per ton of shale, the oil shale being present in an amount in the approximate range 5–75 weight percent of the petroleum asphalt cement and being compounded with the asphalt at a temperature below 375°F.

9. A method for preparing an improved bituminous binder having better aging and adhesion of properties than obtained with similar amounts of similar sized mineral fillers which comprises bringing together under intense mixing conditions the ingredients of claim 1 in absence of a solvent at a temperature in the approximate range 250°–375°F, the oil shale being present in an amount in the approximate range 5–75 weight percent of the asphalt and containing from about 15 to about 40 gallons oil per ton of oil shale.

* * * * *

UNITED STATES PATENT AND TRADEMARK OFFICE
CERTIFICATE OF CORRECTION

PATENT NO. : 3,902,914

DATED : September 2, 1975

INVENTOR(S) : Duane W. Gagle, Homer L. Draper

It is certified that error appears in the above-identified patent and that said Letters Patent are hereby corrected as shown below:

Column 12, claim 4, line 7, before "about" insert -- from --, line 9, before "about" insert -- of --.

Column 12, claim 5, line 11, delete "mat" and insert therefor

-- material -- .

Signed and Sealed this thirtieth Day of March 1976

[SEAL]

Attest:

RUTH C. MASON
Attesting Officer

C. MARSHALL DANN
Commissioner of Patents and Trademarks